UNITED STATES PATENT OFFICE.

PATRICK MURPHY, OF CARMEL, NEW YORK.

VEGETATION-DESTROYING COMPOSITION.

No. 911,255.

Specification of Letters Patent.

Patented Feb. 2, 1909.

Application filed October 16, 1907. Serial No. 397,636.

*To all whom it may concern:*

Be it known that I, PATRICK MURPHY, a citizen of the United States, residing at Carmel, in the county of Putnam and State of New York, have invented certain new and useful Improvements in Vegetation-Destroying Compositions, of which the following is a specification.

My invention relates to improvements in compositions for destroying bushes, weeds and like vegetable growths; and an object of my invention is to provide a vegetation destroyer which will be susceptible of ready preparation, cheap in manufacture, efficacious in use and non-poisonous to man and animals.

In carrying out my invention, I mix together two (2) quarts of kerosene, two (2) quarts of crude petroleum oil, one and one-half (1½) quarts of gasolene; and two (2) quarts of common salt. These ingredients are stirred well together, until the salt is thoroughly mixed with the other ingredients.

The liquid is applied to the stalk of the bush at about six or eight inches from the ground, so that it will run down to the roots. The number of applications necessary to kill the bush will depend upon the size of the bush. If the bush is small, it will be found that only a few applications are needed; and a large bush can be killed easily in a season.

I claim:

A composition of the character described consisting of kerosene, gasolene, crude petroleum oil and common salt in substantially the proportions specified.

Signed at Danbury, Connecticut this fourteenth day of October, 1907.

PATRICK MURPHY.

Witnesses:
   W. S. BENACEY,
   HARRIE T. HOYT.